United States Patent Office 3,192,117
Patented June 29, 1965

3,192,117
HAIR DYE COMPRISING SUBSTITUTED ANTHRA-
QUINONES IN SHAMPOO BASE
Wilhelm Jakob Kaiser and Alfons Sturm, both of Dussel-
dorf-Holthausen, Germany, assignors to Therachemie
chemisch therapeutische Gesellschaft m.b.H., Dussel-
dorf, Germany
No Drawing. Filed Feb. 20, 1962, Ser. No. 174,377
Claims priority, application Germany, Feb. 23, 1961,
T 19,717
8 Claims. (Cl. 167—88)

The invention relates to novel hair dyes and to their manufacture and, more particularly, to hair dyes containing certain anthraquinone compounds.

The use of anthraquinone and certain derivatives thereof, e.g., derivatives containing amino, carboxyl, hydroxyl or sulfo groups in the ring, for the purpose of dyeing hair, especially human hair, is known.

In the practical application of these known dyes it is necessary to undertake the dyeing of the hair at temperatures between 40 and 40% C. This requires the employment of heating caps or of similar devices. These known dyes also have other drawbacks, especially the one whereby the dyeing power usually greatly diminishes when the dyes are incorporated in creams or pastes, as frequently used in practice.

The object of this invention is found in dyes containing certain anthraquinone dyestuffs, as hereinafter more fully described, which unexpectedly and surprisingly do not have the disadvantages named above.

The characteristics of the novel hair dyes reside in the content on anthraquinone dyestuffs which are free from acid groups in the ring and which contain an aliphatic radical, interrupted once or several times by heteroatoms, and attached to the anthraquinone radical not directly, but by way of heteroatoms.

Heteroatoms suitable for the above purpose are especially oxygen and sulfur and, under certain conditions, also nitrogen.

It furthermore has been found that particularly such compounds are applicable whose aliphatic radical contains the group $(CH_2-CH_2X)_n$ once or several times, whereby X denotes an oxygen or sulfur atom, and $n$ is a whole number from 1 to 20, preferably 1–3.

Whereas the anthraquinone radical must be free from acid groups, such as hydroxyl, carboxyl or sulfo groups, other substituents, such as halogens or nitro groups, may be present therein. Particularly suitable are those anthraquinone dyes which contain one or, preferably, two primary amino groups.

The anthraquinone derivatives to be used according to the invention are readily produced by reacting halogenated, nitrated or sulfonated anthraquinones, which may contain one or two primary amino groups, with mono- or polyglycols or with their monoalkyl ethers. The reaction is carried out in the presence of basic materials, e.g., of alkalis. In lieu of the glycols, thioglycols also can be employed, in which case the corresponding sulfur compounds are obtained.

A further mode of production consists, e.g., in reacting 1,4 - diaminoanthraquinone with p-toluenesulfonic acid esters of monoethyl diethylene glycol. In that instance, an aliphatic radical, interrupted by oxygen atoms, is obtained which is attached to the anthraquinone radical by way of nitrogen.

Finally, aliphatic radicals attached to the anthraquinone radical by way of a nitrogen atom also can be obtained by reacting, e.g., 1,4-diamino-2-bromoanthraquinone with suitable amines, e.g., with $NH(C_2H_4OC_2H_4OC_2H_5)_2$.

The hair dyeing agents according to the invention containing the above-named anthraquinone dyes can be provided, if desired, with wetting and washing agents, especially with anionic or nonionic agents, and so used. The dyeability of such mixtures is good. Thus, the dyeing agents can be produced in the form of shampoos, especially cream shampoos, as frequently is desirable in practice.

As wetting agents, particularly alkyl benzene sulfonates, fatty alcohol sulfates, alkyl sulfonates, fatty acid ethanolamides, and addition products of ethylene oxide on fatty acids and fatty alcohols should be named.

Also added to the hair dyeing agents can be permanent waving agents, known per se, based on compounds containing mercapto groups, such as thioglycolic acid, thiolactic acid, mercaptopropane- or mercaptobutane sulfonic acid. The hair drying agents, if desired, can initially be processed with these additives since the dyes named are stable in the presence of these materials, which is another pronounced advantage.

As stated above, the novel hair dyeing agents can be employed to dye hair without the application of heating means, i.e., they can be applied at temperatures below 40° C., that is, substantially at room temperature. The hair dyeing agents thereby may be weakly acid, neutral or also alkaline so that they can be employed in cases where an especial sensitivity against alkalis exists.

Moreover, the hair dyeing agents, although particularly suited for the dyeing of human hair, also can be employed on furs. They may contain thickeners, such as methylcellulose, starch, or others used for this purpose, e.g., higher fatty alcohols, Vaseline, paraffin oil and fatty acids.

The additives are used in the commonly employed quantities. The concentration of the dyes, according to the end use, is up to 5 percent by weight, preferably 0.1 to 2 percent, calculated on the total composition.

Finally, the dyes named can be used singly or in mixture, if desired, in mixture with other dyestuffs. They may serve to dye grey hair or to give any color hair another color.

The preparation of permanent waves in hair previously treated with the hair dyeing agents according to the invention also is feasible without incurring a change in the hue or tint of the hair. This is a further advantage of the hair dyeing agents according to the invention.

Table 1 lists compounds which are particularly suited for the purpose at hand. In the right column, the coloring effect on grey hair is given. However, it should be considered that, upon redyeing of natural hair with these dyes which frequently are red or blue, brown and black hues also are obtained. In the examples to follow below, the anthraquinone dyes are referred to by their number in Table 1.

TABLE 1

| No. | Formula | Color |
|---|---|---|
| 1 | anthraquinone with $O-(CH_2)_2-O(CH_2)_2-OC_2H_5$ substituent | Weak yellow. |
| 2 | anthraquinone with $NH-(CH_2)_2-O-(CH_2)_2OC_2H_5$ substituent | Weak red. |

Table 1—Continued

| No. | Formula | Color |
|---|---|---|
| 3 | 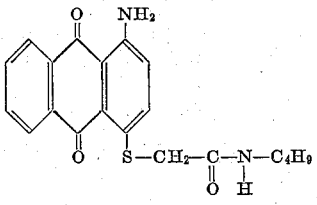 | Brilliant purple. |
| 4 | 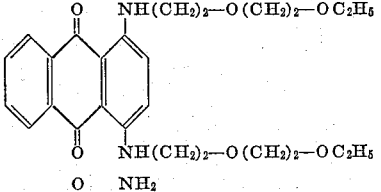 | Blue. |
| 5 | 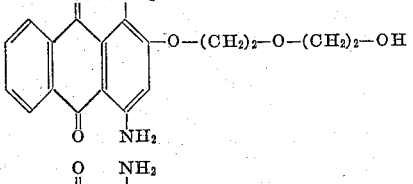 | Strong red with blue hue. |
| 6 | 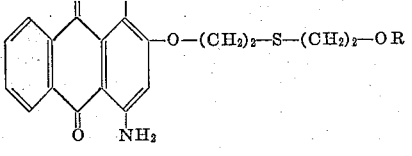 R=H or a lower alkyl radical with 1–4 C-atoms. | Strong red. |
| 7 | 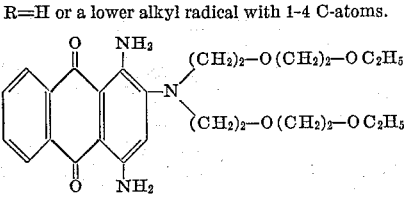 | Blue with slight red hue. |
| 8 | 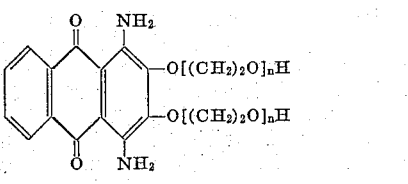 n=1–3 | Red with blue hue. |
| 9 | 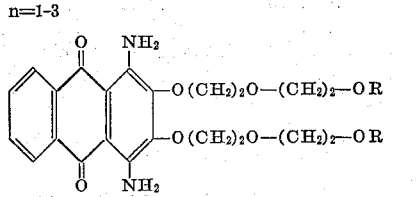 R=H or a lower alkyl radical with 1–4 C-atoms | Red with blue hue. |
| 10 | 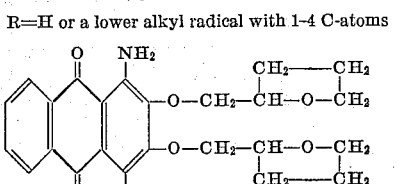 | Red with blue hue. |
| 11 | 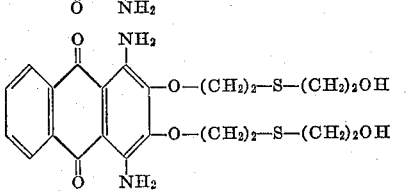 | Red with blue hue. |

Table 1—Continued

| No. | Formula | Color |
|---|---|---|
| 12 | 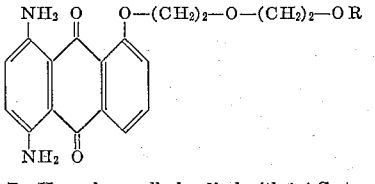 R=H or a lower alkyl radical with 1–4 C-atoms | Blue; slight red hue. |
| 13 | 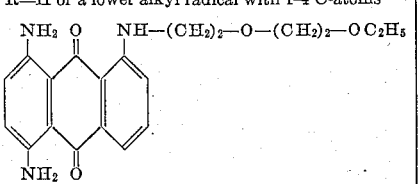 | Blue. |
| 14 | 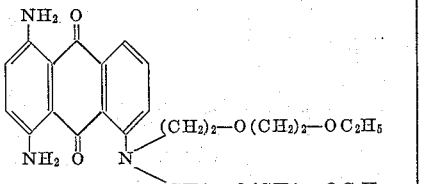 | Blue, a little stronger than 13. |
| 15 | 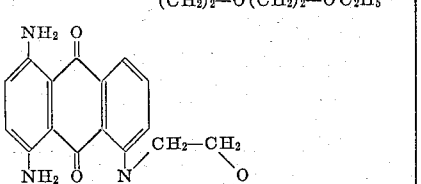 | Blue. |

The dyestuffs shown in Formulae 5, 6, 8–12, 14 and 15 in Table 1 are novel per se, and the manner of their manufacture is given below.

Dye #5

48 g. (1.2 mols) NaOH are dissolved in 1,500 ml. ethylene diglycol, and the water formed thereby is removed at 120° C. by a slow stream of nitrogen. 273 g. (1 mol) 1,4-diamino-2-chloroanthraquinone then are added with good agitation, and the mixture is stirred in a bath of 100° C. for 8 hours, followed by stirring in a bath of 130° C. for 16 hours. The excess solvent then is distilled in vacuo, at the end of the distillation at a bath temperature of 120° C. and 0.5 mm. pressure. The residue is cooled to 100° C., and 1,000 ml. water added thereto, stirred at 90° C. for a short time, neutralized with approximately 18 percent HCl, filtered by suction at approximately 20 to 30° C., suspended in 500 ml. water, again filtered by suction, and dried at 70° C. with a weak vacuum. The powder thus obtained melts at approximately 200° C. without exhibiting a sharp melting point. The correspondent dyestuffs with ether groups (see Dye Formula 5) are obtained by the use of an ethylene diglycol ether with a lower alkyl radical containing 1–4 C-atoms instead of ethylene diglycol as a starting product.

Dye #6

This dyestuff is obtained by the same method as for Dye 5, except that, in lieu of 1,500 ml. ethylene diglycol, 1,500 ml. thiodiglycol are used as the starting product. The correspondent dyestuffs with ether groups (see Dye Formula 6) are obtained by the use of a thiodiglycol ether with a lower alkyl radical containing 1–4 C-atoms instead of thiodiglycol as a starting product.

Dye #8

96 g. NaOH are dissolved in 1,500 ml. diethylene glycol, and the water formed thereby is removed at 120° C. by a slow stream of nitrogen. 307 g. 1,4-diamino-2,3-dichloroanthraquinone then are added with strong agitation, which is continued for 8 hours at 100° C. and another 16 hours at 130° C. The excess solvent then is distilled whereby, at the end of the distillation, the bath temperature is 120° C. and the pressure 0.6 mm. The residue is stirred with 1,000 ml. water at 80–90° C., neutralized with approximately 18 percent HCl, filtered by suction at approximately 20 to 25° C., again suspended in 500 ml. water, suction-filtered and dried in vacuo at 100° C., whereby the reaction product sinters to a wax-like mass.

Dye #9

These dyestuffs are obtained in the same manner as Dyestuff 8 except that, in lieu of 1,500 ml. diethylene glycol, 1,500 ml. of a diethylene glycol ether of the group: methyl ether, ethyl ether, propyl ether or butyl ether is employed as starting product.

Dye #10

This dyestuff is obtained by the same method as used for Dye 8 except that 1,500 ml. thiodiglycol are used as starting product in lieu of diethylene glycol.

Dye #11

The dyestuff is obtained in the same manner as Dye 8 except that 1,500 ml. tetrahydrofurfurol are used as starting product instead of diethylene glycol.

Dye #12

283 g. 1,4-diamino-5-nitroanthraquinone (1 mol) are entered with good agitation at approximately 60° C. in a solution of 48 g. NaOH in 1,000 ml. diethylene glycol monoethyl ether, after that solution had been freed from water at 120° C. by conducting a weak stream of nitrogen therethrough. Agitation is continued for 14 hours at 100° C., the solvent then is distilled in vacuo whereby the bath temperature is increased to a final 120° C. at 4 mm. pressure. Refining of the crude product is carried out as described for Dye 8. The powdered product melts at approximately 130–140° C. without exhibiting a sharp melting point.

Dye #14

283 g. (1 mol) 1,4-diamino-5-nitroanthraquinone are stirred together with 1,500 ml. di(-ethoxyethoxyethyl-)-amine in a bath of 100° C. for 24 hours. The production of the amine is carried out as disiclosed in U.S. Patent 2,285,419.

The excess solvent is distilled in vacuo, whereby the bath temperature is held at 100° C. at a pressure of 0.3 mm. The residue, dried in vacuo at 70° C., is pasty.

Dye #15

This dyestuff is obtained in the same manner as described for Dye 14 except that 1,500 ml. morpholine are used as starting product in lieu of 1,500 ml. di(-ethoxyethyl-)amine.

The invention now will be further illustrated by the following examples. However, it should be understood that these are given merely by way of explanation, not of limitation, and that numerous changes may be made in the details without departing from the spirit and the scope of the invention as hereinafter claimed.

EXAMPLE 1

80 g. cetyl stearyl alcohol and 19 g. coconut alcohol (produced from the fatty acids of coconut oil) are melted together at 90° C. To this mixture, 10 g. Dye 9 are added with agitation at the same temperature. Dye 9 had been manufactured by reacting dichlorinated 1,4-diaminoanthraquinone with monoethyldiethylene glycol in the presence of an alkali. Thereafter, 175 g. of a paste consisting of 58 percent by weight of a fatty alcohol sulfate, produced from coconut fatty acids, and 42 percent water, were stirred in at 90° C. Finally, the mixture is brought to 1,000 g. by making up the diference with hot water and a little ammonia. Upon cooling with agitation, a cream having a pH of 8.5 to 9 is obtained. This cream dyes grey hair red with a blue hue at 30° C. in approximately 20 minutes.

A cream of the same composition, but containing only 5 g. of the same dyestuff, imparts to dark brown hair a chestnut color within 15–20 minutes.

In a process analogous to the one given above, grey hair can be dyed using the dyestuffs named in Table 1 under (1) to (4), (6) to (8), (10), (11), and (13). The shade listed in Table 1 is conferred on the hair thus treated.

EXAMPLE 2

10 g. Dye 10, produced from 1,4-diamino-5-nitroanthraquinone by reaction with a solution of sodium in monoethyldiethylene glycol, are worked to 1,000 g. of a cream in the manner described in Example 1. This cream dyes grey hair a strong blue with a slight red hue.

A cream of the same composition, but containing only 1 g. Dye 12 and adjusted to a pH of 4 with acetic acid, imparts to hair which had yellowed a beautiful silver color.

EXAMPLE 3

9 g. Dye 12 are heated with 80 g. cetyl stearyl alcohol and 19 g. coconut alcohol at 90° C., as described in Example 1, to which, at that temperature and under agitation, 175 g. of a paste are added consisting of 58 percent by weight fatty alcohol sulfate ($C_{12}$–$C_{18}$) and 42 percent water. A hot solution of 1 g. of the sodium salt of 2,4-dinitronaphtholsulfonic acid in 20 ml. water is stirred in, and the solution brought to 980 g. with hot water. After cooling to room temperature with continued agitation, enough water and ammonia are added to bring the solution to 1,000 g. at a pH of 8.5. A cream results which dyes grey hair to a brownish black in approximately 20 minutes at approximately 30° C.

EXAMPLE 4

A cream is prepared using 7.7 g. Dye 12 and 0.7 g. Dye 9, as described in Example 3, using 1.6 g. of the sodium salt of 2,4-dinitronaphtholsulfonic acid. 1,000 g. of a cream thus are obtained which dyes grey hair to a black brown in approximately 20 minutes at approximately 30° C.

EXAMPLE 5

8 g. Dye 12 are worked into 1,000 g. of paste, as described in Example 3, whereby the sodium salt named therein is replaced by 2 g. of the sodium salt of the mono-(4-amino-3-nitroanilid) of maleic acid. The latter had been produced according to Example 2 of German Patent 1,087,565.

The paste thus obtained dyes naturally greyed hair dark brown.

EXAMPLE 6

A cream is prepared using 6 g. Dye 12 and 4 g. sodium salt of the mono(-4-amino-3-nitroanilid) of maleic acid, in the manner described in Example 5. The cream thus obtained dyes grey hair dark blond.

EXAMPLE 7

5 g. Dye 9 and 5 g. of the same maleic acid amide as described in Example 6 are worked to 1,000 g. of a cream, as described in Example 6. Grey hair treated therewith assumes a mahogany color.

When the color proportions are changed so that, in lieu of 5 g. dye, only 2 g. Dye 9 and 8 g. of the same maleic acid amide, as described in Example 6, are employed, grey hair, treated with the resulting cream, becomes titian red.

EXAMPLE 8

A cream was prepared as described in Example 1, containing, in 1,000 g. total, 5 g. Dye 12 and 5 g. 4-amino-3-nitrophenyl urea. This cream dyes grey hair a medium chestnut brown.

When this cream contains only 0.5 g. Dye 12 and 4.5 g. of the urea derivative named above, grey hair is dyed gold blond.

EXAMPLE 9

10 g. Dye 12 are melted together, at 90° C., with 50 g. cetyl stearyl alcohol and 19 g. coconut alcohol. Into this, at the same temperature, are stirred 175 g. of a paste consisting of 58 percent by weight fatty alcohol sulfate, prepared from coconut fatty acids, and 42 percent water. By addition of hot water to a total of almost 2,000 g. under agitation, continued agitation until cooled, and adjustment to 2,000 g. and a pH of 8.5 with aqueous ammonia, a viscous liquid is obtained which dyes grey hair a strong blue with a slight red hue.

EXAMPLE 10

10 g. Dye 12 are melted together, at 90° C., with 88 g. cetyl stearyl alcohol, 19 g. coconut alcohol, and 109 g. of the reaction product of a fatty alcohol mixture ($C_8$–$C_{18}$) with 10 mol ethylene oxide. The mixture then is thinned to approximately 1,000 g. with hot water while stirring, cooled to room temperature under continued agitation, and then adjusted to 1,000 g. and a pH of 8.5 with water and ammonia. This cream dyes grey hair not quite as strongly blue as the cream of like dye concenrtation described in Example 2.

EXAMPLE 11

10 g. Dye 12 are stirred together with 150 g. paraffin oil at 90° C. Then 175 g. of a paste consisting of 58 g. fatty alcohol sulfate, prepared from coconut fatty acids, and 42 percent water, are stirred in at the same temperature. The solution is then brought to 980 g. by stirring in hot water and cooled to room temperature. 20 g. aqueous ammonia solution, then are stirred in. The cream thus obtained has a pH of 8.5 and dyes grey hair a less strong blue than the cream according to Example 2.

EXAMPLE 12

10 g. Dye 14, prepared by reacting 1,4-diamino-5-nitro-anthraquinone with di-(ethoxyethoxyethyl)-amine, are worked into 1,000 g. of a cream as described in Example 1. The cream dyes grey hair to a similar color as described in paragraph of Example 2, with but a lesser red hue.

EXAMPLE 13

5 g. Dye 5, prepared by reacting a monochlorinated 1,4-diaminoanthraquinone (using $SO_2Cl_2$ for the chlorination) with a solution of sodium in diethylene glycol, are worked into 1,000 g. of a cream as described in Example 1. This cream dyes hair a strong red with blue hue.

When 10 g. ammonium thiogylcolate are added to this cream, the hair dyed therewith is dyed considerably stronger than with the cream containing no thioglycolate. This cream also is very stable on storage, and the increased effect obtained by the addition of the thioglycolate remains even after a considerable period of storage.

We claim as our invention:

1. A hair dye composition comprising an anthraquinone compound incorporated in a shampoo, said compound having the formula

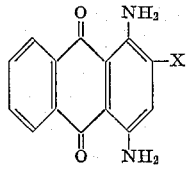

wherein X is selected from the group consisting of
(a) —O—($CH_2$)$_2$—O—($CH_2$)$_2$—OR, and
(b) —O—($CH_2$)$_2$—S—($CH_2$)$_2$—OR and R is selected from the group consisting of hydrogen and a lower alkyl of 1 to 4 C-atoms.

2. A hair-dye composition comprising an anthraquinone compound incorporated in a shampoo, said compound having the formula

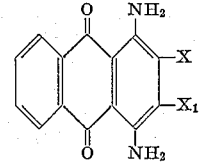

wherein X and $X_1$ are alike and selected from the group consisting of
(a) —O[($CH_2$)$_2$O]$_n$H, wherein n equals 1–3;
(b) —O($CH_2$)$_2$O—($CH_2$)$_2$—OR, wherein R is selected from the group consisting of hydrogen and a lower alkyl of 1–4 C-atoms;

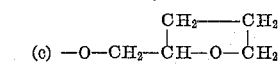

(d) —O—($CH_2$)$_2$—S—($CH_2$)$_2$OH

3. A hair-dye composition comprising an anthraquinone compound incorporated in a shampoo, said compound having the formula

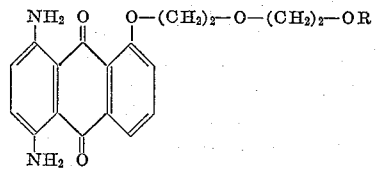

wherein R is a lower alkyl of 1–4 C-atoms.

4. A hair-dye composition comprising an anthraquinone compound incorporated in a shampoo, said compound having the formula

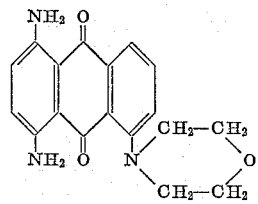

5. A process for dyeing of human hair which comprises applying to said hair for approximately 15 to 20 minutes and substantially at room temperature a shampoo having as active dyeing ingredient a dyestuff of the formula

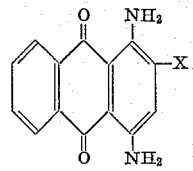

wherein X is selected from the group consisting of
(a) —O—($CH_2$)$_2$—O—($CH_2$)$_2$—OR, and
(b) —O—($CH_2$)$_2$—S—($CH_2$)$_2$—OR and R is selected from the group consisting of hydrogen and a lower alkyl of 1 to 4 C-atoms.

6. A process for dyeing of human hair which comprises applying to said hair for approximately 15 to 20 minutes and substantially at room temperature a shampoo having as active dyeing ingredient a dyestuff of the formula

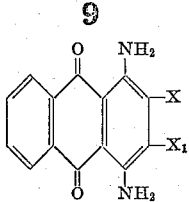

wherein X and $X_1$ are alike and selected from the group consisting of
 (a) $-O[(CH_2)_2O]_nH$, wherein n equals 1–3;
 (b) $-O(CH_2)_2O-(CH_2)_2-OR$, wherein R is selected from the group consisting of hydrogen and a lower alkyl of 1–4 C-atoms;
 (c) $-O-CH_2-\underset{\underset{\displaystyle O-CH_2}{|}}{\overset{\overset{\displaystyle CH_2-CH_2}{|}}{CH}}$, and
 (d) $-O-(CH_2)_2-S-(CH_2)_2OH$ 7. A process for dyeing of human hair which comprises applying to said hair for approximately 15 to 20 minutes and substantially at room temperature a shampoo having as active dye ingredient a dyestuff of the formula

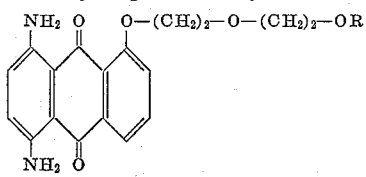

wherein R is a lower alkyl of 1–4 C-atoms.

8. A process for dyeing of human hair which comprises applying to said hair for approximately 15 to 20 minutes and substantially at room temperature a shampoo having as active dyeing ingredient a dyestuff of the formula

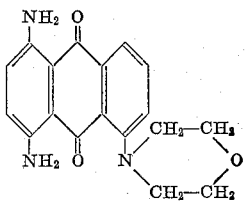

References Cited by the Examiner

UNITED STATES PATENTS

| | | | |
|---|---|---|---|
| 2,338,745 | 1/44 | Riper et al. | 167—88 |
| 2,338,746 | 1/44 | Riper et al. | 167—88 |
| 2,769,748 | 11/56 | Eckardt et al. | 167—88 |
| 2,937,190 | 5/60 | Straley et al. | 260—377 |
| 2,983,651 | 5/61 | Seemuller | 167—88 |
| 2,990,413 | 6/61 | Gehrke | 260—380 |
| 2,992,240 | 7/61 | Lodge | 260—380 |

FOREIGN PATENTS

| | | |
|---|---|---|
| 124,527 | 3/28 | Switzerland. |
| 311,210 | 1/56 | Switzerland. |
| 345,631 | 5/60 | Switzerland. |

JULIAN S. LEVITT, *Primary Examiner.*
FRANK CACCIAPAGLIA, JR., LEWIS GOTTS, *Examiners.*